United States Patent Office 3,506,214
Patented Apr. 14, 1970

3,506,214
SPRING WOUND FISHING REEL
Nicolas Laszlo, Cluses, France, assignor to Ets. Carpano & Pons, Cluses, France, a company of France
Filed Aug. 1, 1967, Ser. No. 657,615
Claims priority, application France, Aug. 11, 1966, 72,880
Int. Cl. A01k 89/02
U.S. Cl. 242—84.3
8 Claims

ABSTRACT OF THE DISCLOSURE

A fly casting reel is provided with a casing to house a spool and its associated retaining latch, and a spring motor rotatable through connected gearing and a clutch to rotate said spool. Manual pivoting of a brake lever releases a normally applied brake shoe from its associated brake drum slidably coupled to the spool which permits the spool to be rotated by the spring motor. The gear train terminates in a clutch allowing the spool to be removed from its stub shaft by a spring-biased retaining latch without affecting the spring motor. An adjustable guide is provided on the housing.

---

The purpose of fly casting consists in casting on waters a small and very light lure in a manner simulating the fall of an insect.

In order to cast this very light lure, there must be added thereto an additional floating weight, in the form of a silk line. This assembly of a light lure and a heavy thread must receive from the fisherman a sufficient speed but its fall on the water must be particularly soft: for this purpose the fisherman whips the line in the air then casts it in order to cause the fall of the lure on the water at a relatively considerable distance away. During this whipping, the fisherman gives out the line with his left hand while his right hand handles the rod.

This silk line is wound on a reel fixed to the rod and with a semi-automatic, automatic or manual control, according to the particular cases, and which plays no role during the casting and therefore influences neither the length nor the precision of the cast, which are characteristics which depend essentially upon the ability of the fisherman.

The reel used for fly casting is naturally only a reservoir in which can be stored about 28 meters of silk which it must allow to unwind without resistance and bring back manually or automatically.

With a reel having an automatic return, the fisherman has the possibility of getting back the unwound line with the same hand holding the rod. A reel of this type usually has a spiral spring wound in a barrel driving the line spool by the intermediary of a multiplying gear. The tensioning of the spring occurs automatically as soon as the spool is unwound.

Despite the incontestable advantages which the automatic reel has over semi-automatic or manual reels, the automatic reel has not obtained the success that it deserves because the various construction of which it has been the object all have various disadvantages the principal ones of which are:

(a) The line spool is often inaccessible without dismantling the reel:

(b) The dismantling of the reel without previous relaxation of the spiral spring can cause material and bodily damages;

(c) The design of certain casting reels on the market, in particular the fact that the spool is entirely covered by an encased cover, only permits withdrawal of the line in a particular sector of the cover through a fixed opening.

Moreover, the relatively great play existing between the cheek of the spool and the cover can sometimes occasion the wedging of the line, an accident which requires the complete dismantling of the reel and which deteriorates the line, the cost of which is often higher than that of the reel;

(d) The spool being hidden by a cover, it is generally impossible to manually actuate it in the case of non-functioning of the reel's driving mechanism;

(e) In known automatic reels, an exaggerated tensioning of the motor spring can give rise to its breakage since these reels do not have a mechanism for limiting the winding couple;

(f) During the relaxation of the motor spring, the casing containing this spring can turn and risks driving the line located outside the reel and thereby harming the same;

(g) The spools of lines generally cannot be changed instantaneously.

Various patents have already described fly casting reels and in particular:

U.S. Patents Nos. 2,220,017, 2,572,354 and 2,609,160 all three showing an automatic reel in which the line spool is removably mounted on the side of the casing in order to be replaced if need be by another spool which could carry a line of different cross-section.

U.S. Patent No. 1,654,667 which relates to an automatic fly casting reel in which the guide wire is mounted at the extremity of the pivoting arm and is adapted to permit a variation of the position of the guide wire relative to the casing as desired by the fisherman.

U.S. Patents 2,124,524, 2,572,354, 2,609,160, 2,672,-217, and 2,708,079 which all relate to automatic fly casting reels having a clutch between the spring motor of their driving mechanism and the spool in order to completely rewind the spring without danger of breakage by pulling on the line of the spool. This clutch also prevents increasing the manual tensioning of the springs beyond a determined value by the action of the handle or of the charging tray with which reels are habitually provided.

The purpose of the present invention is to create a new fly casting reel with an automatic obviating to all the disadvantages mentioned above.

Such a reel comprises, as in known reels, a casing containing a spring mechanism for rotating a line spool, this spool being disposed on one side of the casing and means operative to lock it on a shaft controlled by the mechanism, for rotating it, or for freeing it from this shaft in order to se parate it from the casing by simple sliding on the shaft.

According to a characteristic of the invention, a device controls the relaxation of the motor spring of the reel mechanism, without driving the spool, when the means for locking the spool are in a position permitting separation of this spool from the casing.

According to another characteristic of the invention, the reel is provided with a couple limiting device preventing the increase of the tension of the spring motor beyond a predetermined value.

According to a third equally important characteristic of the invention, there is provided a clutch between the last gear of the multiplicating gear of the mechanism and the driving shaft of the spool and a device actuating this clutch when the spool is locked on its shaft.

According to another important characteristic, the reel comprises a wire guide formed by a removable ring, means permitting the mounting of this ring in at least two distinct angular positions removed by 180° one from the other relative to its axis of symmetry substantially parallel to the shaft of the spool.

Other characteristics and important features of the fly casting reel according to the invention will now be described in the following description with reference to the accompanying drawing which represents one embodiment given by way of non-limiting example:

Figure 1:
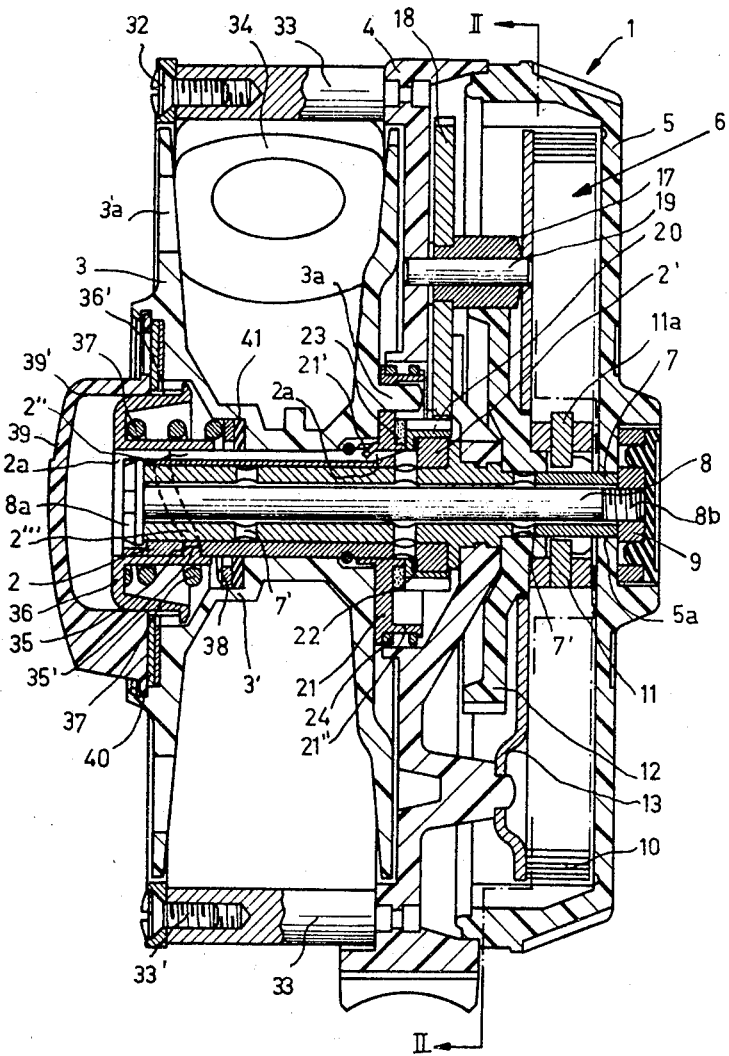
FIGURE 1 is a vertical cross-section of the reel according to the invention.

The reel shown comprises a casing 1, having a generally cylindrical shape, on the left face of which projects a shaft 2 for rotating a spool 3 removably secured on this shaft.

Casing 1 is constituted by two plastic flanges 4 and 5, enclosing mechanism 6 to which is linked shaft 2, as will be described later.

Flange 4 is moulded on its central part on a pipe 7 projecting on either side of this flange and which is engaged by its right hand extremity in opening 5a of flange 5 while its left part carries shaft 2 which is hollow. The securing in assembled position of flanges 4 and 5 and of removable shaft 2 is made possible by a rod 8 applied on the left by head 8a against the extremity of shaft 2 and pipe 7 and having on the right a threading 8b permitting the screwing of a nut 9 maintaining flange 5 to flange 4 while permitting the first to rotate relative to the second.

Figure 2:
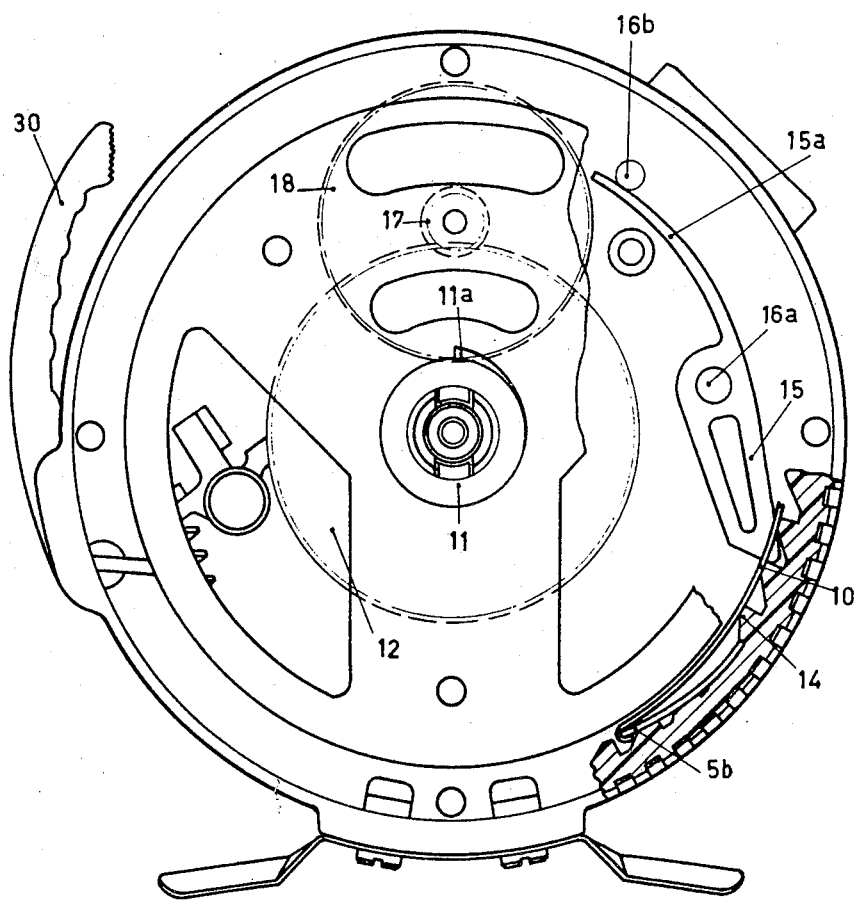
FIGURE 2 is a cross-sectional view taken along line II—II of FIGURE 1.

It is in effect on this flange that he fisherman acs rotatively when he wishes to tension spring 10 of the reel mechanism. This spring is stretched between a projection 5b provided in the inner surface of flange 5 (FIGURE 2) and a beak 11a on an annular piece 11 angularly fast with a wheel 12 rotatably mounted on pipe 7 below a bridge 13 secured to flange 4.

Flange 5 has teeth 14 with which cooperates pawl 15 (FIGURE 2) constituted by a plastic lever pivoted around a shaft 16a mounted between bridge 13 and flange 4 and of which part 15a, opposite the meshing extremity, is supple and bears against a stud 16b. Part 15a of lever 15 forms the elastic return element for the pawl.

Wheel 12 previously mentioned constitutes the first gear of a multiplying gear comprising a pinion 17 with which it meshes, a gear 18 fast with this pinion and pivoted with the latter on a shaft 19 secured between flange 4 and bridge 13 and a gear 20 meshing with this gear.

This gear 20 is rotatably mounted on the right hand extremity of shaft 2, between a shoulder 2' of this shaft and a disk 21 which can move slightly longitudinally on shaft 2 but which is angularly blocked by the engagement of a projection 21' in a longitudinal groove 2" of the shaft. The disk 21 is prevented from leaving shaft 2 by movement towards the left of the disk by means of a retainer 22.

Between disk 21 and gear 20, which is also capable of a slight longitudinal movement on shaft 2, corresponding to that of the disk, is disposed a friction packing 23 which, by exerting on disk 21 a left to right push of a sufficient intensity causes, this disk and gear 20 to become kinematically fast while they are freely mounted one relative to the other if this push is not present.

Disk 21, packing 23 and the left hand surface of gear 20 thus constitute the elements of a linking clutch between the gear work of the driving mechanism of the reel and hollow shaft 2. Due to this clutch the removal of spool 3 from shaft 2 can only take place by causing the relaxation of the spring motor 10 as will be seen later.

In order that spring 10 be positioned when the spool is locked on shaft 2, it is indispensable that gear 20 must be able to turn on the shaft while it will have on the contrary to rotate with the shaft when the spool 3 must be rotated by the spring. For the purpose, the fly casting rod according to the invention is provided with a unidirectional blocking device which is constituted by the disk 21 the edge of which forms a drum 21" around which is disposed an annular spring 24 having two coils in the example shown, and the diameter of which is less than that of drum 21" in retracted position of the spring. This spring is engaged by one extremity 24' in a slot 4' of flange 4 and by the other extremity 24", in a window 4" of this flange facing a pivoting stop 25.

Thus all angular action exerted on shaft 2 or on gear 20 in a direction tending to compress spring 24 on drum 21" will cause the tightening of this spring on this drum which will be prevented from turning in that direction.

Shaft 2 or gear 20 on the contrary will be free to move angularly by exerting on one of them a push in the opposite direction.

This unidirectional blocking device thus prevents the motor spring from relaxing as long as spring 24 is maintained tight against drum 21". Moreover, due to the combined action of this device and of the clutch formed by its disk 21, packing 23 and the left side of gear 20, motor spring 10 cannot be excessively rewound to the extent that might cause breakage.

It is in effect evident that as soon as the tightening of the coils of spring 10 will have become relatively rigid, the couple communicated to casing 5 will be directly transmitted to wheel 20. According to a particularly advantageous characteristic of the invention, it is provided that the compression effort exerted on disk 21, in the manner which will be indicated later, in order to maintain the clutch in mesh be insufficient to prevent a slipping of this clutch when wheel 20 receives integrally the couple exerted on flange 5, which is equivalent to saying that beak 11a moves angularly by following flange 5 as soon as wheel 20 slides on packing 23.

Figure 3:
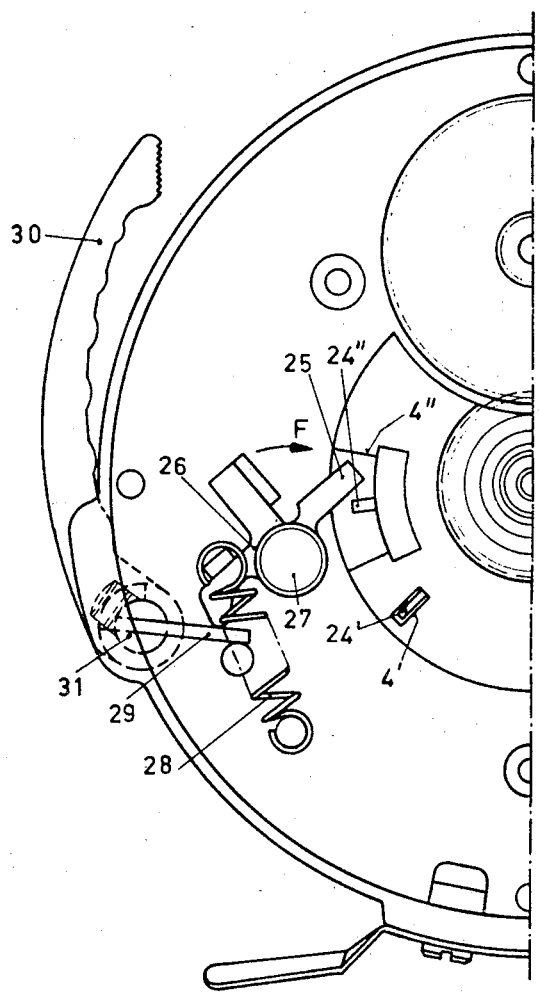
FIGURE 3 is a partial view of FIGURE 2 with one of its elements broken away.

The tightening action of spring 24 on drum 21" can be cancelled by moving stop 25 in the direction F in order to bring together the extremity 24" of the spring towards its extremity 24' (FIGURE 3).

This stop is formed by one of the arms of a lever 26 pivoted at 27 on flange 4 and urged by spring 28 tending to maintain it in a position such that stop 25 will remain distant from extremity 24" of spring 24.

Lever 26 is in contact with arm 29 secured at the end of a control lever 30 pivoted at 31 and which projects above spool 3 and on the edge of casing 1.

It is on this lever 30 that acts the fisherman when he wishes to bring back line which he has previously unwound from spool 3; by this lever the fisherman causes in effect the placing out of operation of the unidirectional blocking device for shaft 2 which can then be rotated by spring 10. The rotational speed of this shaft is proportional to the displacement given to stop 25, that is to say of the loosening of spring 24 occasioned by this movement.

Shaft 31 for the pivoting of lever 30 is mounted between casing 1 and ring 32 surrounding the left flange of spool 3 and held in the casing by four pillars 33. This ring serves also as a support for a wire guide ring 34, made of hard metal or of a metal covered by a hard chromium. Such a wire guide is in effect provided on its edge with two pairs of projections 34' and 34" extending in opposite directions from the ring and which engage respectively in recesses a of ring 32, and b of flange 4 of casing 1. As shown, this flange and this ring have different similar recesses a and b which permits the fisherman to place ring 34 in the position that he prefers by previously loosening screws 33' which ensure the fastening of ring 32 on pillars 33.

The fastening of spool 3 on shaft 2 and the actuating of clutch 21, 23, 20 connecting this shaft to the gear work of the motor mechanism takes place by the intermediary of the device which will be now described.

The external surface of shaft 2 has a helical groove 2''' the part of which closest to the left extremity of this shaft opens on a flat section 2a provided in an extension of the bottom of the longitudinal groove 2″ previously cited.

This helical groove is intended to receive a projection 35′ on the inner surface of a sleeve 35 slidingly mounted on the shaft and surrounded by a cap 36 which is fast thereto. This cap is disposed in a recess 3′ of the left flange of spool 3 and a spring 37 is placed between the cap and an annular packing 38 mounted at the bottom of recess 3′, under the central part of the core of the spool. It is spring 37 which has to give to disk 21 the push necessary to make the clutch of the reel engage.

Cap 36 has on its outer edge a series of flutes 36′ and is engaged slidingly by its flutes in corresponding grooves provided on the inner surface 39′ of a locking button 39 which is retained by its elastic edges in pivoting fashion in an annular groove provided in the left flange of spool 3. The assembly is so mounted that all rotation of button 39 in either direction causes a corresponding movement of cap 36 and consequently of projection 35′. Since this projection 35′ is engaged in helical groove 2‴, an angular movement of cap 36 will also mean an axial sliding of this cap relative to the hollow shaft 2, inside button 39. The pitch of the helical groove 2‴ is selected in such a way that the strain developed by spring 37 cannot itself occasion the rotation of cap 36 and its sliding inside button 39.

The maximum compression of spring 37, necessary to make the clutch of the reel engage, is obtained when the projection 35′ is in the position illustrated in the drawing and prevents spool 3 from sliding on shaft 2.

Spring 37 will however be relaxed if projection 35′ is driven on flat section 2a by a movement of 180° of cap 36 and of button 39, to which this cap is connected. In this case, spool 3 can be freed from shaft 2 since projection 35′ will slide towards the left in FIGURE 1 on the flat section.

Figure 4:
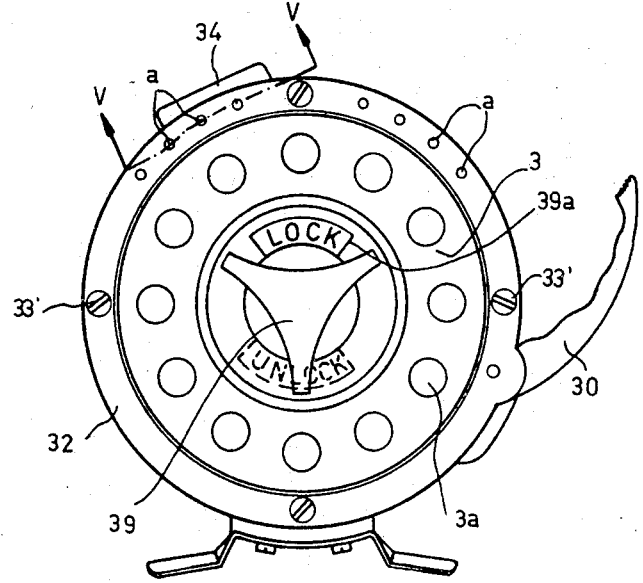
FIGURE 4 is a back view of the reel according to the invention and FIGURE 5 shows a detailed view in cross-section taken along line V—V of FIGURE 4.
Figure 5:
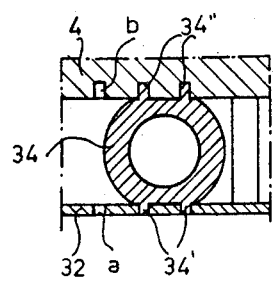

In the reel according to the invention, these two positions of button 39 and of the members associated therewith are designated by corresponding inscriptions "LOCK" and "UNLOCK" (FIGURE 4) carried on a plaque 40 fast with spool 3 and which can be seen alternately through window 39a cut in button 39. These inscriptions are angularly spaced by 180°.

In order to pass from one inscription to the other, button 39 will have to be turned counter clockwise without spool 3 turning on its shaft, as it is held by the unidirectional blocking device.

It is spool 3 which transmits the push exerted by spring 37 on disk 21 of this device. The correct angular positioning of the spool on shaft 2, necessary in order to permit the engagement of projection 35′ in groove 2‴, is obtained by means of a stud 3a carried by the right flange of spool 3 and which engages in a corresponding passage of disk 21.

In order to obtain the complete and total lubrication of the gears of the reel mechanism and of the inside of shaft 2, the supporting pipe 7 is perforated with distribution openings 7′ permitting the passage of oil which can be introduced under pressure by the left or right end of the pipe, once pull rod 8 is removed. Openings 2a provided in shaft 2, near gear wheel 20, cooperate with openings 7′ above.

In the case where spring 10, or one of the elements of the multiplicating gear of the reel, were to prevent the driving of shaft 2, which would totally demobilize a reel of conventional construction, spool 3 could nevertheless still be driven, by having previously freed the unidirectional blocking device of shaft 2, by acting on lever 30, it suffices in effect to introduce a rod, a branch or the end of a pencil, in one of the twelve holes 3′a provided in the left flange of spool 3.

It should be noted finally that even in unlocked position, the spool cannot fall by itself from shaft 2 if the same is placed vertically against the bottom: this spool in effect has an elastic washer 41 which pinches slightly shaft 2 and gives only if the spool is subjected to a sufficient axial push in a direction opposite that of casing 1.

The advantages of the above described reel are therefore the following:

(a) Possibility of changing the spool without having to dismantle the reel;

(b) The possibility of rotating this spool even if the driving mechanism is inoperative by the engagement of a rod in one of the holes of the outer flange of the spool.

(c) The possibility of placing the guide wire in different positions as desired by the fisherman; in particular, to turn it around by 180° relative to its axis of symmetry parallel to the shaft of the spool in order that its side worn by the line be replaced by its other intact side;

(d) The possibility of dismantling the driving mechanism with the knowledge that the motor spring is completely relaxed;

(e) The possibility to rewind completely the motor spring without risk of breaking it;

(f) Centralized lubrication of the movable parts of the reel;

(g) Impossibility for the spool to fall by itself from the driving shaft if it is in unlocked position;

(h) No part is moved during the relaxation of the motor spring.

What is claimed is:

1. A fly casting reel comprising a casing, a motor spring in said casing, a shaft rotated by said spring, a line spool mounted on said shaft on one side of said casing, spool control means movable between a first position for locking said spool on said shaft and a second position for unlocking said spool to permit slidably removing said spool from said shaft and clutch means for controlling the relaxation of said spring, without driving said spool, when said control means are in said second position.

2. A fly casting reel according to claim 1, having a multiplying gear system having a first and a last gear connecting said shaft to said spring, said clutch means being positioned between said last gear and said shaft and including a disk with a part facing said last gear angularly rigid with said shaft but movable longitudinally thereon by a given distance, said last gear being mounted on said shaft to pivot thereon and to slide on said shaft by a distance up to said given distance; said clutch means being formed by at least a part of said disk, by part of said last gear and by a packing positioned between said disk and said last gear, said shaft having a shoulder, and said spool control means having means for bringing together said shoulder and said disk so as to clamp said last gear and packing therebetween to effect a kinematic link between said last gear and said shaft.

3. Reel according to claim 2, having a device for unidirectionally locking said shaft and including said disk.

4. Reel according to claim 3, wherein said spool has a pair of flanges and one of said flanges is in contact with said disk, said means for locking said spool on said shaft being positioned in such a way as to exert a sufficient axial push on said spool to actuate said clutch means when said spool is locked on said shaft, this push becoming zero when said spool is not locked.

5. Reel according to claim 4, wherein said spool control means comprises a helical groove in said shaft, a pusher head on said spool matching with said groove by means of a projection and having a spring tensed between said head and said spool, said groove being positioned in such a way that in a given angular position of said head on said shaft, the spring be compressed by said head and provide against said spool the push needed for the operation of said clutch means and that for a second angular position of said head, this spring be sufficiently relaxed so that said clutch means no longer operates.

6. Reel according to claim 5, wherein said head has an outer cylindrical profile with longitudinal grooves, said head being covered by a control button pivoted on a flange of said spool opposite said casing, said flange having openings therein, ribs of corresponding shape and form to said grooves of said head being provided therein, said head being in mesh with said button by the cooperation of said ribs and grooves and being slidable in said button.

7. Reel according to claim 6, wherein said button has a flange fast thereon, with a window therein, and having inscriptions characteristic of the unlocked and locked position of said spool, said inscriptions being carried by an element fast with said flange of said spool on which said button is pivoted, said inscriptions being positioned angularly in such a way as to appear in said window when said button and said pusher head associated therewith occupy an angular position corresponding to these inscriptions.

8. Reel according to claim 1, having a line guide formed by a removable ring and means permitting mounting said ring in at least two distinct angular positions out of phase by 180° one relative to the other and relative to the axis of symmetry thereof substantially parallel to the shaft of said spool.

References Cited

UNITED STATES PATENTS

| | | | |
|---|---|---|---|
| 841,891 | 1/1907 | Pepper | 242—84.3 |
| 2,130,670 | 9/1938 | Maynes | 242—84.3 |
| 2,130,671 | 9/1938 | Maynes | 242—84.3 |
| 2,340,892 | 2/1944 | Maynes | 242—84.3 X |
| 2,592,143 | 4/1952 | Holtz et al. | 242—107.5 |
| 3,099,413 | 7/1963 | Kress et al. | 242—68.3 |
| 3,145,944 | 8/1964 | Pendleton | 242—68.3 X |

BILLY S. TAYLOR, Primary Examiner

U.S. Cl. X.R.
242—84.5